C. S. FOGH.
PROCESS FOR TREATING ORES AND APPARATUS THEREFOR.
APPLICATION FILED JULY 17, 1919.
1,362,408.
Patented Dec. 14, 1920.
2 SHEETS—SHEET 1.
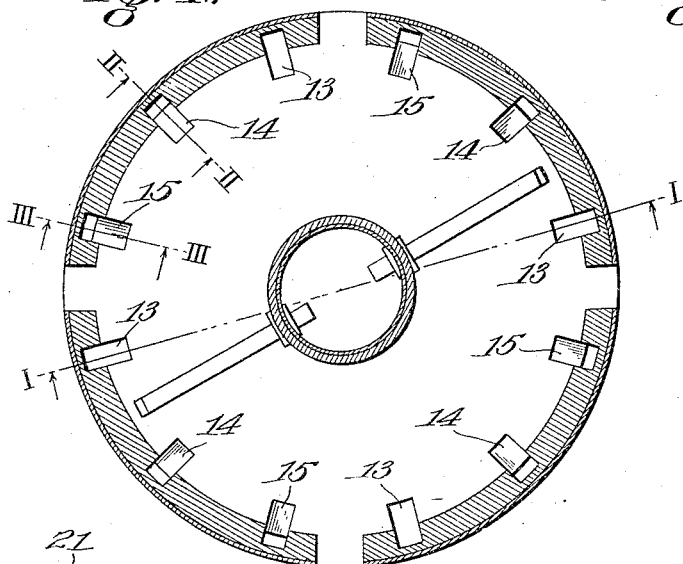
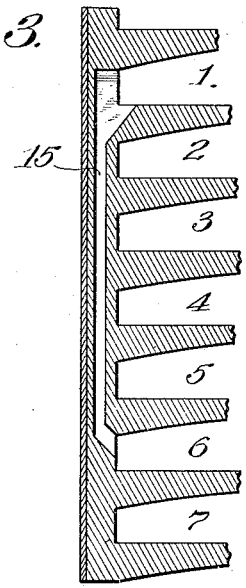
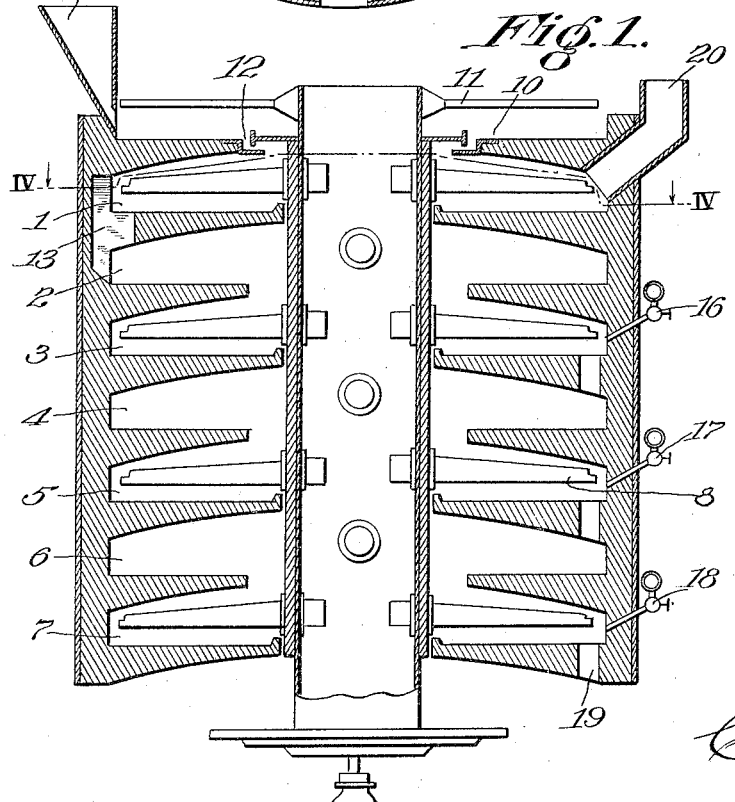
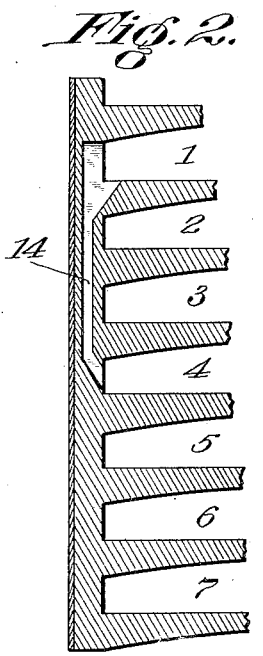

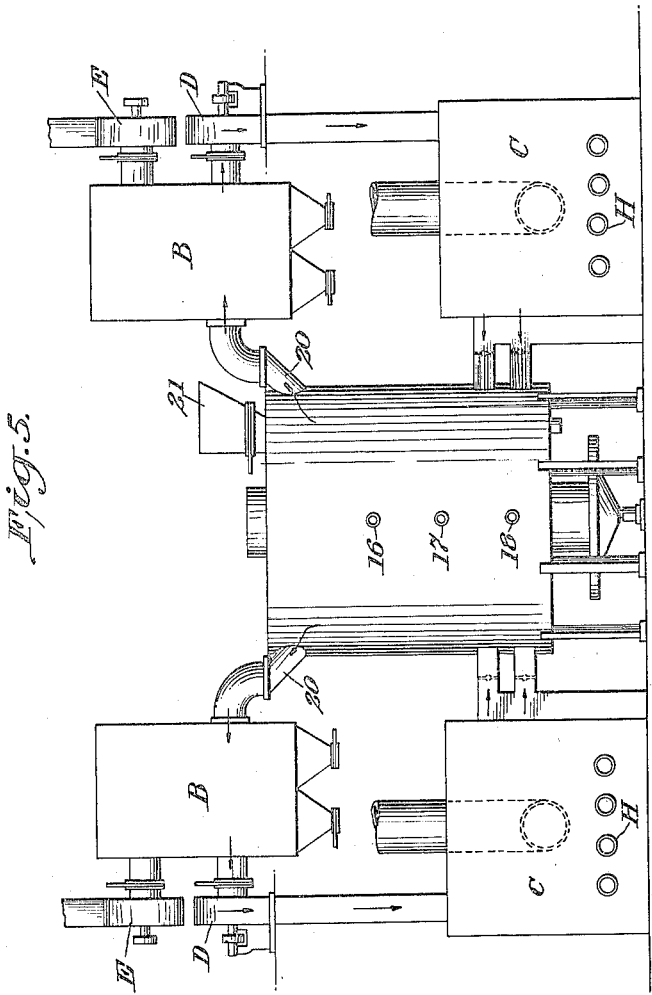

UNITED STATES PATENT OFFICE.

CARL S. FOGH, OF PHILADELPHIA, PENNSYLVANIA.

PROCESS OF TREATING ORES AND APPARATUS THEREFOR.

1,362,408.   Specification of Letters Patent.   Patented Dec. 14, 1920.

Application filed July 17, 1919. Serial No. 311,475.

*To all whom it may concern:*

Be it known that I, CARL S. FOGH, a subject of the King of Denmark, residing at Philadelphia, in the county of Philadelphia and State of Pennsylvania, have invented certain new and useful Improvements in Processes of Treating Ores and Apparatus Therefor, of which the following is a specification.

This invention is a process of and apparatus for the treatment of ores or other materials with a gaseous reagent capable of uniting therewith with liberation or absorption of heat. More specifically, the invention relates to the conduct, regulation and control of such exothermic reactions as the roasting of sulfid ores or other sulfurbearing materials, whether for the production of sulfur dioxid or of sulfates, although the method is applicable in the continuous production of water gas and similar endothermic reactions. For a full understanding of the invention I will describe the same by reference as an illustrated example, to the roasting of zinc blende, referring to the accompanying drawings showing one form of apparatus embodying the invention and adapted to carry my novel process into effect.

In said drawings, which are diagrammatic in character—

Figure 1 is a vertical central section of a multiple hearth roasting furnace in accordance with my invention, the section being taken on line I—I of Fig. 4;

Fig. 2 is a fragmentary vertical section of the same on line II—II of Fig. 4;

Fig. 3 is a fragmentary vertical section of the same on line III—III of Fig. 4;

Fig. 4 is a transverse section of the furnace on line IV—IV of Fig. 1; and

Fig. 5 is a diagrammatic elevation of one form of apparatus in which exit gases are returned to the furnace in cyclic flow, with suitable adjustment of their heat content.

The furnace embodies the usual general structural features of a multiple hearth furnace. As illustrated by way of example it is provided with seven superposed hearths consecutively numbered from 1 to 7 beginning at the uppermost inclosed hearth. Each hearth is provided with the usual stirring arm 8, and the usual apertures are provided whereby portions of the charge may be transferred from each hearth to that next below, as is the common practice in furnaces of this type. 10 represents the open drying hearth at the top of the furnace, and 11 the stirring arm by which the charge is progressively fed through the charging apertures 12 to the upper furnace hearth 1. In respect to the above-mentioned features of construction the furnace may be of any of the standard multiple hearth types.

Numeral 13 (Figs. 1 and 4) indicates apertures whereby portions of the ore upon the uppermost hearth 1 are gradually transferred to the hearth next below. In the particular construction illustrated four such apertures are provided as clearly shown in Fig. 4. The ore portions thus delivered to hearth No. 2 progress downwardly through the furnace over the hearths in regular sequence, precisely as in the usual operation of furnaces of this type.

Numeral 14 (Figs. 2 and 4) indicates supplementary or by-pass channels, shown as four in number, which lead directly from the first to the fourth hearth in series, by-passing the intermediate hearths numbered 2 and 3. Numeral 15 (Figs. 3 and 4) indicates other supplementary or by-pass channels, also shown as four in number, leading directly from the first to the sixth hearth in series, by-passing the intermediate hearths numbered 2, 3, 4 and 5. The arrangement of the several channels is such that a portion only of the charge which has been supplied to hearth No. 1 and has been preheated thereon, progresses regularly downwardly through the furnace, traversing each of the hearths in regular sequence. A further portion of the preheated charge from hearth No. 1 is discharged or by-passed through the channels 14 to hearth No. 4, from which point it follows the regular course through the furnace. Still another portion of the pre-heated charge from hearth No. 1 is discharged or by-passed through the channels 15 directly to hearth No. 6, from which point it follows the regular course of the material through the furnace. Numerals 16, 17 and 18 indicate valved pipes for the supply of air or other gaseous reagent, as for instance rich $SO_2$ gas, these pipes communicating respectively with hearths Nos. 3, 5 and 7. 19 is the discharge aperture for the roasted ore or other treated material on the lowermost hearth. 20 represents the outlet for the furnace gases, and 21 the ore feed hopper discharging upon the drying hearth 10.

The essential elements of the assembly indicated in Fig. 5 are the furnace A which is illustrated as of the general type shown in Fig. 1; one or more gas-cleaning devices or fume arresters B (shown as two in number) which are required only in case non-gaseous particles are to be separated from the gas stream at this point, or in case gaseous particles are to be separated by condensation; and a temperature-regulating device or devices C (also illustrated in duplicate) which serve to supply heat to or abstract heat from the circulating gas stream, in amounts sufficient to maintain the desired temperature conditions within the furnace A. D D represent fans or equivalent impelling devices for maintaining the circulation of the gas through the closed system formed by connecting the above mentioned elements by means of appropriate flues or conduits as clearly illustrated. The system may operate at substantially atmospheric pressure, or at pressures above or below atmospheric as may be desirable in particular cases.

It is well understood in this art that in dealing with exothermic reactions of the type mentioned above, as when auto roasting, whether such reactions are carried out upon multiple hearths or in so-called straight line furnaces or other types of furnace construction, there is a strong tendency for the heat development to occur in large measure in a certain relatively restricted zone or region of the furnace, which is usually about the central part of the structure. In explanation of the purpose of the by-pass channels above described, it may be stated that the temperature of the portion of the charge lying at any given time upon a given hearth depends in part upon the sensible heat of the charge fed to that hearth and in part upon the heat reaction developed at that hearth. Hence it follows naturally that the temperature within the furnace tends to reach a maximum at the region where the exothermic reaction attains the maximum velocity: and it follows also that when the reaction velocity diminishes as the roasting or other operation approaches completion, the temperature of the charge likewise tends to fall. Hence in certain existing types of furnace it is necessary to supply heat to the charge from an external source, especially in that portion of the furnace in which the sulfur content of the ore has become depleted, when it is desired to eliminate the potential heat units as thoroughly as possible.

According to the present invention I am able to maintain a substantially uniform temperature, or any desired temperature gradient throughout the furnace. I accomplish this by maintaining a proper relation between the sensible heat of the charge and of the gases at each portion of the furnace, (for example upon each hearth in a furnace of the type illustrated) and the potentially available heat units supplied thereto in the form of unoxidized ore or other reactive material. I preferably accomplish this result in the following manner:

The entire charge, for example zinc blende, is fed to and pre-heated upon the uppermost inclosed hearth 1, preferably to the temperature necessary to initiate the reaction, that is to say in this particular case to at least 450° C. Thereupon by the operation of the stirring arms, the pre-heated charge is delivered gradually, substantially simultaneously, and in substantially equal quantities to the second, fourth and sixth hearths of the furnace. To each of these hearths I supply the quantity of air necessary for the roasting, having due regard of course in case sulfid ores are roasted to produce sulfur dioxid, to the concentration of gas desired. I prefer in practice to admit this air in each case to the hearth next below that to which the pre-heated ore is supplied, as is shown in the drawing by the position of the air inlets 16, 17 and 18. The potentially available heat units of the ore are therefore made available and converted into sensible heat at a plurality of predetermined separate regions or zones, while the sensible heat of the charge from the upper hearths is transferred regularly through the furnace, receiving at the proper points the proper heat increment from the fresh charge delivered at those points. The arrangement is therefore such that whereas the weight of ore upon the hearths or groups of hearths increases from the top to the bottom of the furnace, the volume of air passing over these hearths in counterflow to the ore increases on the contrary from the bottom to the top of this furnace. In other words the maximum ore body encounters the minimum air volume. This tends to equalize the temperatures throughout the furnace, as will be readily understood: for instance, the total charge is re-assembled or collected upon the lowermost group of hearths, and encounters there the minimum volume of air, which is accordingly rapidly heated to the desired temperature without the necessity of supplying heat at this region of the furnace from an external source. As will also be understood a constant temperature may be maintained throughout the furnace, or any desired heat gradient may be maintained, in accordance with the quantity of potential heat units supplied to the various hearths.

While I have described and illustrated a construction in which pre-heated ore is subdivided into substantially equal portions, which portions are separately roasted and subsequently re-assembled, it will be understood that the subdivision of the charge need not necessarily be into three or any other number of equal parts. In this respect a wide variation is permissible in the actual operation, it being essential only that the supply of air or other gaseous reagent should be suitably proportioned to the quantity of ore or other material with which it is to react. Also, the operation is not limited to a furnace of the multiple hearth type, although this type is preferred as involving the fewest mechanical complications. The process may be practised however in any type of furnace or kiln in which a portion or portions of pre-heated charge, containing potentially available heat units, may be by-passed from one part of the furnace to another part nearer the outlet, without, in the course of such transfer giving up a substantial measure of its potentially available heat.

Nor, as stated above, is the invention limited to the roasting of sulfid ores with formation of sulfur dioxid, but is generally applicable to all cases in which the introduction of a gaseous reagent, as oxygen, chlorin or the like or combustion gases gives rise to an exothermic reaction. For instance it may be applied to the roasting of zinc or other sulfids to the corresponding sulfates; to the oxidation of the lower oxids of iron, manganese, nickel or the like; to the chlorination of sulfid ores; and sulfatizing of copper ores and in general to a wide variety or similar exothermic reactions.

In the roasting of zinc blende the operation may readily be carried out without supplying additional heat from an outside source; and in fact by suitably cooling the furnace walls, as by means of water or air, or by allowing for the dissipation of excess heat by radiation, it is possible to operate the furnace at a very high capacity per unit of hearth area as compared with the standard furnaces of similar type. For this purpose it is merely necessary that the charge containing available heat units and the gaseous reagent should be introduced at the maximum rate at which the excess of reaction heat can be dissipated, and the reaction thereby regulated and controlled.

In certain cases, such as magnetic auto roasting or drying, the maximum rate is governed by the quantity of ore which may readily be moved through a certain size furnace; in other problems such as zinc blende roasting the maximum rate is governed by the quantity of gases which may readily pass through the furnace without creating too high gas velocities.

In case it is desired to produce in the operation a gas, such as sulfur dioxid, having a predetermined relatively high concentration, I prefer to establish a cyclical flow of portions of the gas through the furnace, substantially in the manner described in my copending application Serial Number 275,777, filed February 8, 1919; except that in the present case it is not usually necessary or advisable to conserve the heat in the circulating gases. In fact, in the case of strongly exothermic reactions, such circulating gases must be suitably cooled in order to control the reaction temperature, and maintain the operating temperature at the predetermined point. By operating under these conditions the temperature of the furnace, and the concentration of the gas, may be maintained at any desired predetermined value within practical limits, while at the same time the capacity of the furnace, per unit of hearth area, may be increased substantially to the limit attainable in direct-fired furnaces.

The manifold advantages of this invention will be readily understood from the foregoing description by those skilled in this art. Among the primary advantages the following may be mentioned:

I. The capacity of the furnace is very greatly increased, for the reason that all portions of the hearth area are performing substantially the same maximum service.

II. The radiation losses are readily controlled on account of the absence of local regions of excessive temperature, which are usually regions of excessive heat loss.

III. The temperature may be accurately controlled and if desired kept substantially uniform throughout the furnace, being maintained at any predetermined point within the limits at which the reaction takes place. This results in a high operating efficiency.

IV. The destructive effect of very high local temperatures is avoided, there being no zones of excessive temperature development.

V. It becomes possible, particularly when portions of the furnace gases are returned to the furnace in cyclical flow, as fully described in my copending application above mentioned, to utilize oxygen or air which has been enriched in oxygen to any desired degree, without the production of excessive local temperatures.

VI. Under the same conditions of cyclical flow of the gases it is possible to produce reaction gases, as sulfur dioxid, of any desired or predetermined concentration. For example a strong gas can be produced from a lean blende, while effecting a sweet roast of the ore.

VII. The total as well as partial heat balances may easily be established as there are no more variables than there are equations. It is therefore possible to determine the temperatures of the gases as well as the ores at any point of the furnace and thereby ascertain if it is possible for the desired reaction to take place.

As fully set forth above, when auto-roasting is desired, each section is supplied with a corresponding part of the pre-heated material containing a sufficient quantity of potential heat units to complete the reaction. But my invention is also applicable to methods of treatment requiring an added supply of heat units. Thus, in case the pre-heated material does not contain sufficient potential heat units to complete the reaction, the balance is supplied for example by external firing, in the opposite ratio to the contents of potential heat units in the material on the several hearths. This is the case for instance when it is desired to sulfatize or chloridize copper ores, or in general to carry out reactions of an endothermic character. Numerous other applications of the invention will be apparent to those skilled in this art.

I claim:—

1. Process of treating ores or other substances capable of reaction with a gaseous reagent, comprising pre-heating a moving body of ore, subdividing the pre-heated ore into a plurality of portions, and directly delivering said portions at a plurality of points spaced along the line of movement of the ore.

2. Process of treating ores or other substances capable of reaction with a gaseous reagent, comprising pre-heating a moving body of ore, subdividing the pre-heated ore into a plurality of portions, directly delivering said portions at a plurality of points spaced along the line of movement of the ore, and supplying to each of said distributed ore portions the quantity of gaseous reagent requisite for the reaction.

3. Process of treating ores or other substances capable of reaction with a gaseous reagent, comprising pre-heating a moving body of ore, subdividing the pre-heated ore into a plurality of portions, directly delivering said portions at a plurality of points spaced along the line of movement of the ore, supplying to each of said distributed ore portions the quantity of gaseous reagent requisite for the reaction, and progressively re-assembling the treated ore portions.

4. Process of treating ores or other substances capable of exothermic reaction with a gaseous reagent, comprising pre-heating the ore, subdividing the pre-heated ore into a plurality of portions, supplying to each of said ore portions the quantity of gaseous reagent requisite for the reaction, progressively re-assembling the treated ore portions, and re-introducing into the furnace a portion of the exit gases in cyclic flow, thereby controlling the reaction and maintaining the desired temperatures in the furnace.

5. Process of treating sulfid ores comprising pre-heating the ore, subdividing the pre-heated ore into a plurality of ore portions, supplying to each of said ore portions the quantity of oxygen requisite for the reaction, progressively re-assembling the treated ore portions, and re-introducing into the furnace a portion of the exit gases in cyclic flow, thereby controlling the reaction and maintaining the desired temperatures in the furnace.

6. Process of treating sulfid ores comprising pre-heating the ore, subdividing the pre-heated ore into a plurality of substantially equal ore portions, supplying to each of said ore portions the quantity of oxygen requisite for the reaction, and progressively re-assembling the treated ore portions, thereby controlling the reaction and maintaining the desired temperatures in the furnace.

7. Process of treating sulfid ores comprising pre-heating the ore, subdividing the pre-heated ore into a plurality of substantially equal ore portions, supplying to each of said ore portions the quantity of oxygen requisite for the reaction, progressively re-assembling the treated ore portions, and re-introducing into the furnace a portion of the exit gases in cyclic flow, thereby controlling the reaction and maintaining the desired temperatures in the furnace.

8. Process of treating ores or other substances capable of reaction with a gaseous reagent, comprising pre-heating the ore substantially to the reacting temperature, advancing the ore through the furnace while supplying thereto a gaseous reagent at a plurality of points, and by-passing portions of the pre-heated ore in such manner as to control the temperatures throughout the furnace.

9. Apparatus for treating ores or the like comprising a furnace, means for causing the ore to progress therethrough, means for supplying a gaseous reagent at a plurality of points spaced along the line of movement of the ore, and means for by-passing pre-heated ore to regions in proximity to the several points of supply of the gaseous reagent.

10. Apparatus for treating ores or the like comprising a furnace, means for causing the ore to progress therethrough, means for supplying a gaseous reagent at a plurality of points spaced along the line of movement of the ore, means for by-passing pre-heated ore to regions in proximity to the several points of supply of the gaseous reagent, and means for returning to the furnace in cyclic flow a portion of the exit gases.

11. Apparatus for treating ores or the like comprising a furnace of the multiple hearth type, means for causing the ore to progress therethrough, means for supplying a gaseous reagent at a plurality of points spaced along the line of movement of the ore, means for by-passing pre-heated ore to regions in proximity to the several points of supply of the gaseous reagent, and means for returning to the furnace in cyclic flow a portion of the exit gases.

In testimony whereof I affix my signature.

CARL S. FOGH.